United States Patent

Stempler et al.

[15] 3,699,421

[45] Oct. 17, 1972

[54] TAPE POSITION SENSOR, OPTICAL

[72] Inventors: Samuel Stempler, Brooklyn; Jacob Tellerman, Bayside, both of N.Y.

[73] Assignee: Kollsman Instrument Corporation, Syosset, N.Y.

[22] Filed: Jan. 21, 1971

[21] Appl. No.: 108,460

[52] U.S. Cl. .................318/640, 318/480, 318/562, 250/219 D
[51] Int. Cl. .............................................G05b 1/06
[58] Field of Search...318/640, 562, 480; 250/219 D, 250/220 R

[56] References Cited

UNITED STATES PATENTS

| | | | |
|---|---|---|---|
| 3,020,460 | 2/1962 | Morin et al. | 318/480 X |
| 3,356,918 | 12/1967 | Williams | 318/162 X |
| 3,358,202 | 12/1967 | Pabst et al. | 318/480 X |
| 3,558,895 | 1/1971 | Hartman | 250/220 R |

*Primary Examiner*—Benjamin Dobeck
*Attorney*—E. Manning Giles, J. Patrick Cagney, Michael A. Kondzella and Richard A. Zachar

[57] ABSTRACT

An indicating arrangement includes a plurality of tape display systems each including a longitudinally movable display tape having a functional scale and a coded pattern in pre-determined relation thereon. Optical detection units produce digital output signals representative of the actual position of the coded pattern on the tape. An input register produces digital input signals representative of the required position of the coded pattern on the tape. Movement of the tape is controlled by servo-positioning means that respond to the digital input and output signals and a central processor is connected to actuate the tape display systems in a time-sharing sequence.

11 Claims, 9 Drawing Figures

INVENTORS
JACOB TELLERMAN
SAMUEL STEMPLER
BY J. Patrick Cagney
ATTORNEY

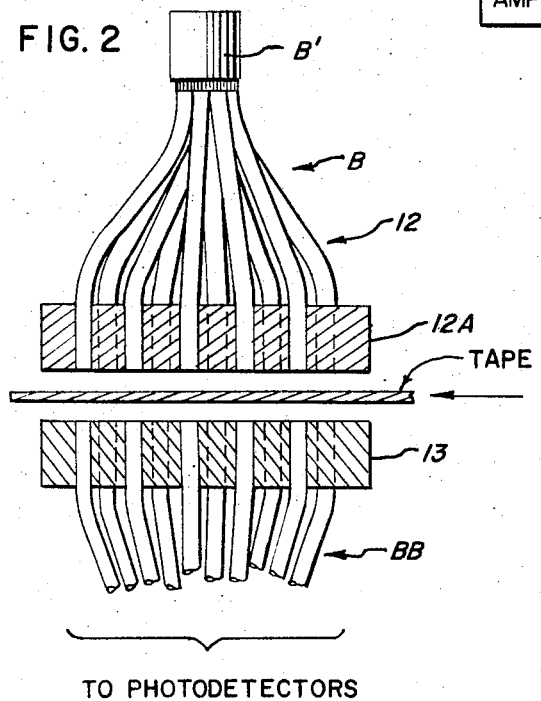
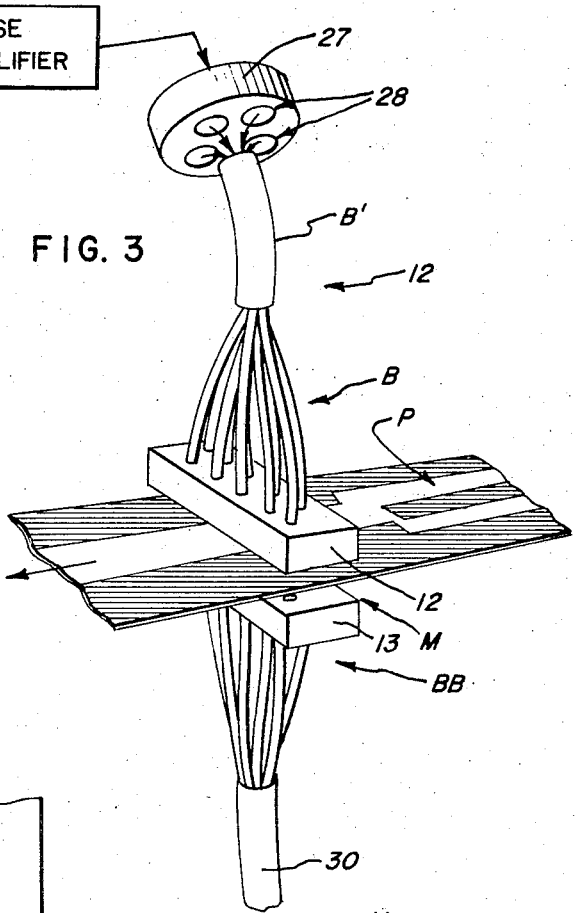
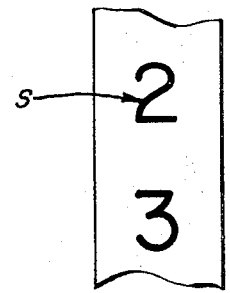
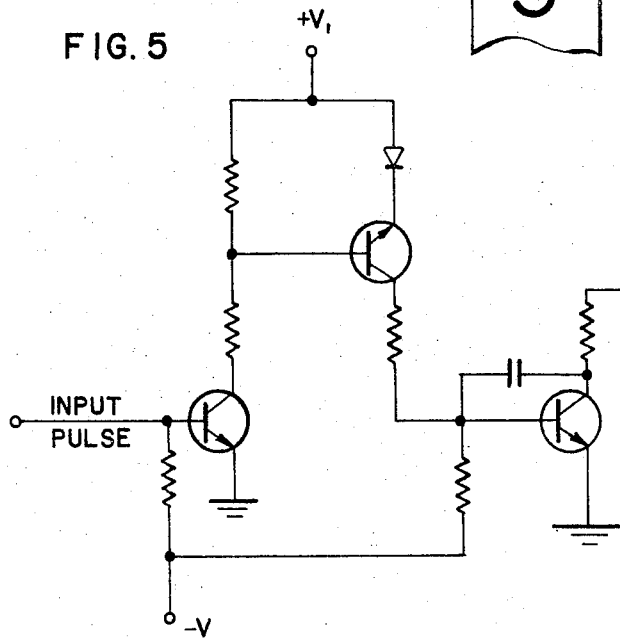
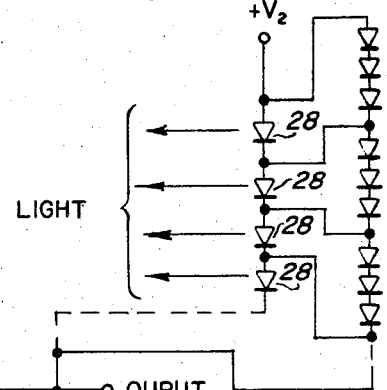
INVENTORS
JACOB TELLERMAN
SAMUEL STEMPLER
BY J. Patrick Cagney
ATTORNEY

INVENTORS
JACOB TELLERMAN
SAMUEL STEMPLER

BY *J. Patrick Cagney*

ATTORNEY

3,699,421

TAPE POSITION SENSOR, OPTICAL

BACKGROUND OF THE INVENTION

The present invention relates generally to positional sensing mechanisms and, more particularly, to an optical sensing arrangement having particular application as a tape position feed-back component in digital computer controlled aircraft instrumentation.

Numerous display units, such as vertical scale aircraft instruments, employ movable display or read-out tapes which are mechanically positioned. In the case of vertical scale aircraft instruments for indicating altitude, mach, air speed and the like, air data computers supply digital input signals to servo drive systems to control the positioning of the tapes.

Full utilization of the accuracy provided by the digital input signals depends upon a concomitant, reliable, accurate and simple tape position feed-back unit. Prior instrument systems have used synchros, linear and non-linear potentiometers, and shaft encoders; all geared to the tape transport mechanism to monitor and provide the necessary servo error signals to control the tape position. These components, while adequate when used with analogue input signals, tend to degrade the accuracy that can be achieved with an all digital system. Moreover, problems related to accuracy, tape "stretch," indexing and possible slippage between the feed-back element and tape, and non-linear display requirements have not been entirely negated by existing feed-back components.

SUMMARY OF THE INVENTION

In accordance with the present invention in its broad aspect, a highly accurate technique, based upon encoding on the rear of each tape the digital equivalent of the data printed on the front (display) side of the tape, is used to reliably and economically negate the problems above mentioned.

The encoding technique, in accordance with a more particular aspect of the invention, utilizes a separate optical sensing arrangement for each tape including a pulse excited emitter of radiant energy, for example, an infrared diode emitter, with a common detector being provided for monitoring the various tapes. An input set of fiber optic bundles, one for each tape, is positioned to direct multiple components of the emitted radiant energy toward each tape to be incident upon a multi-track positional code pattern on each tape. A pick-up set of fiber optic bundles, one for each tape, is positioned in close proximity to the code pattern on each tape to pick-up code-affected radiant energy and transmit such to the detector. The plurality of tapes are serially encoded and a central processor is connected to actuate the tape display systems on a time-sharing sequence. This permits the use of a common photo-detector to respond to the radiant energy transmitted by corresponding pick-up bundles from each tape. The detector provides position signals from each tape to be compared to the input signals from the air data computer so that a correction signal can be applied to each servo drive mechanism, one for each tape, to position each tape.

In one embodiment the code pattern on each tape is defined by light transmitting and light blocking areas on the tape and the tape is interposed between the emitter bundles and the pick-up bundles. In this embodiment infrared light is emitted and the tape, which utilizes a base strip of a high temperature polyimide, is covered by a photo emulsion that is exposed photographically so as to define a code pattern, the tape areas with no coating thereby being transparent to infrared transmission.

In another embodiment encoding is accomplished through reflection of emitted radiant energy from a metalic coating formed in the pattern of a reflective Gray binary code on an absorbing black material of the tape, the emitting and the pick-up bundles being positioned on the same side of the tape.

In each case and in accordance with a more particular, but important, aspect of the invention, the emitting fiber optic bundles are randomly spliced at their radiant energy input ends, the radiant energy being supplied by a number of light emitting diodes so that the radiant energy of each diode is picked-up by at least some of the fibers of each bundle. This redundancy insures operativeness of the system notwithstanding failure of one of the emitting diodes. The pick-up bundles are randomly spliced at their output ends to insure a uniform response of the common photodetector.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:

FIGS. 2 and 3 are detailed views showing the illuminating and detecting tape heads of the monitoring unit;

FIG. 4 is a detailed view showing the front surface of the tape and illustrating numerical readout data thereon;

FIG. 5 is an electrical circuit diagram illustrating a typical pulse drive circuit;

Figure 1:
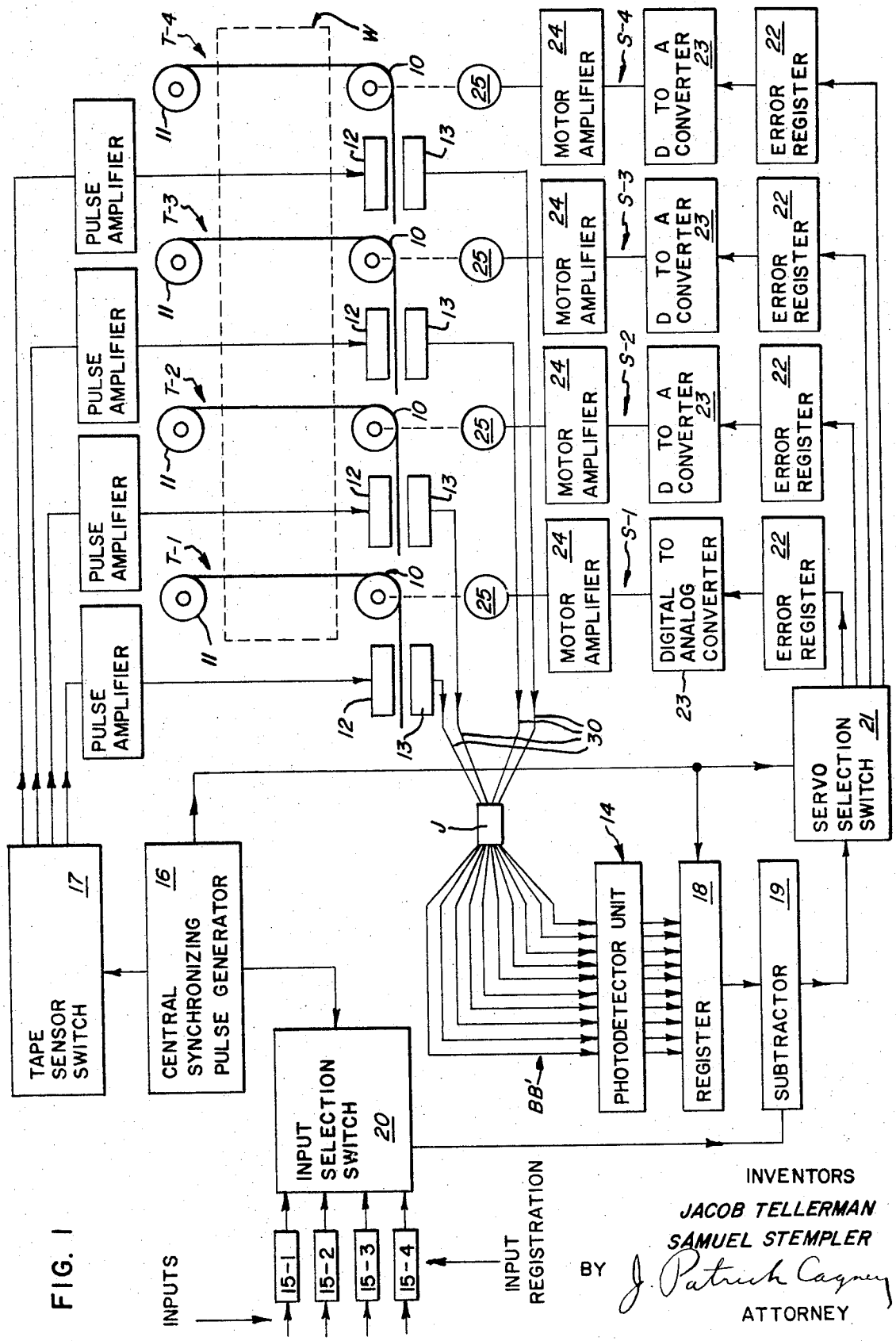
FIG. 1 is a simplified schematic diagram showing an indicating arrangement operative in a time-sharing sequence in accordance with the present invention.

Referring now to the drawings, a preferred embodiment of the invention, as illustrated in FIG. 1, consists of a group of display units functioning as a vertical scale aircraft instrument indicating arrangement. Each of the various functions to be indicated is presented on a separate vertically movable display tape T-1, T-2, T-3 and T-4, each positioned by a separate servo drive system S-1, S-2, S-3 and S-4, respectively, in a time-shared control arrangement in which a common digital data processor network acts in sequence to compare digital input signals for each tape with optically derived digital output signals from each tape to provide separate correction signals for appropriately actuating each servo. Typically, air data computers supply digital input signals representative of altitude, vertical velocity, air speed, mach, acceleration, angle of attach and the like, each to control a separate display tape. While only four display tapes are shown, it will e understood that the system may incorporate any desired number in accordance with the particular display functions to be provided.

In accordance with this invention, each display tape, as shown in FIGS. 3 and 4, has display indicia defining a scale S on its front face arranged in predetermined relation with a digitally encoded multi-track pattern P on its back face, the code pattern cooperating with an optical monitoring unit M for direct reading of tape position, thereby achieving improved system accuracy and reliability.

The separate tape control and optical monitoring units are combined in a unique time-sharing system wherein pulsed radiant energy is used to provide a digital readout of actual tape position for comparison with the command position fed in binary form.

Each of the servo systems drives a separate tape transport unit, each of which includes a drive roller 10 and one or more idler rollers 11 defining a tape travel path that traverses a viewing or window region W spaced from the locations of the optical monitoring systems.

To derive the digital output signals that represent the actual tape position, each optical monitoring unit illustrated in FIG. 1 utilizes infrared energy in a through-transmission relation to the tape and includes a light emitter unit 12 and a detector head 13 disposed in confronting relation on opposite sides of each tape at a location spaced from the viewing window W. The detector heads 13 connect to a common photo-detector unit 14 which, as will be explained more fully below, has a separate detector channel corresponding to each code track, each detector channel being supplied from all of the detector heads 13. Solid state components are used for the emitters and detectors of the infrared energy to afford reliable operation over a wide temperature range. As will become apparent, the optical tape detection system disclosed herein enables wide utilization of fiber optics to enhance the system reliability. (Glass fiber wave guides are efficient in transfer of infrared light energy, even in various complex bending and twisting configurations as may be required.) To provide the digital input signals that represent the desired or command position, a set of input registers 15-1, 15-2, 15-3 and 15-4, respectively, is provided to store the input data as received from an air data computer or other source.

The central processor network includes a central synchronizing pulse generator 16 for controlling the time-sharing operation of the system through connection to a tape solid state selector switch 17, a tape output register 18, and a subtract unit 19, in order to monitor each tape display system separately and in sequence. The tape selection switch 17 is connected through a separate pulse amplifier to the individual light emitter units 12 to provide optical pulsing of the tapes in sequence.

When the first tape T-1 is being pulsed, its output is detected in the common photodetector unit 14 and transferred to the tape output register 18 which presents digital output signals representing actual tape position for comparison with digital input signals in input register 15-1 to produce a control signal for servo system S-1. Input selection is provided by the input selection switch 20 (solid state) which is synchronized with pulse generator 16. The succeeding tapes are similarly monitored, each in sequence and corresponding control signals are derived and applied to each servo system. A solid state servo selection switch 21 synchronized by generator 16 gates the subtractor 19 output to the proper servo.

Each servo system is comprised of a digital error register 22, a digital to analogue converter 23, a motor amplifier 24 and a servo motor 25 connected to the corresponding drive roller 10. The digital error registers 22 store the control signals between each pulse cycle to provide a continuous analogue control signal for each servo motor.

INFRARED EMITTERS

With reference to FIGS. 2 and 3, each light emitter unit 12 consists of an illuminator head 12A that receives a number of fiber optic bundles B and an emitter face 12B which mounts four gallium arsenide light emitter diodes 28. Each of the bundles B comprise numerous individual fibers which are randomly spliced together with the individual fibers of the other bundles B (see FIG. 2) so that a common fiber optic bundle B' is formed to receive the radiant energy emitted by diodes 28. This insures that at least some of the individual fibers of each of the bundles B receives radiant energy from each of the diodes 28. Deterioration of output of one or more diodes produces, therefore, only a minor change in radiant energy applied to any one of the fiber optic bundles. Even loss of radiant energy from a shorted diode does not affect the energy output of any bundle greatly because of the superimposition and integration effects. Only slight local illumination changes will result at the optic fiber bundle output ends.

A pulsed drive circuit is shown in FIG. 5 with its output connected essentially as a current driver to pulse-excite the four emitter diodes 28 which are connected in series. Each diode is excited with a peak current of about 500 milliamperes resulting in a voltage drop of about 1.5 volts across each diode. The current level is controlled by the resistor in series with the emitter diodes and the voltage drops of the emitter diodes in the collector circuit of the output transistor. Pulsing-type excitation is utilized to be compatible with or synchronized by the time-sharing control of the tapes and it is particularly practical because of the fast response characteristic of the emitter diodes and because pulsing helps to reduce dissipated power and infrared diode junction temperature rise.

The light emitter arrangement thus permits an efficient utilization of infrared energy, while also providing a high degree of reliability through redundancy. A shorted diode will not affect the excitation of other diodes connected in a series in a given pulse circuit. When an emitter diode fails by opening, the remaining series-connected emitter diodes will not be affected in the circuit arrangement shown in FIG. 5. Each emitter diode is shunted by a set of three series-connected silicon PN junction diodes. The shunting junction diodes provide a path that continues to carry the current in the event the corresponding emitter diode opens. Typically, the voltage drop across each set of three PN junction is approximately two volts, so that the shunting diodes are normally non-conducting during operation of the emitting diodes.

As shown in FIGS. 2 and 3, the fiber optic bundles B transmit the infrared light from the diodes 28 toward each of the coded tracks on the tape. In the illustrated embodiment, the code pattern P includes ten tracks and is illuminated by ten bundles B, a separate one of the bundles B for each code track. It will be appreciated that as a consequence of the random splicing referred to above, each code track receives equal illumination under any condition of emitter diode light distribution. As stated above, the optic fibers are composed of glass (rather than plastic) to obtain good transmission characteristics for the infrared light and to withstand high temperature limits. The length of the optic fiber paths is comparatively short so that the light loss is determined by the quality of the terminations of the bundles, rather than the loss of transmission due to bundle length.

INFRARED DETECTORS

Figure 6:
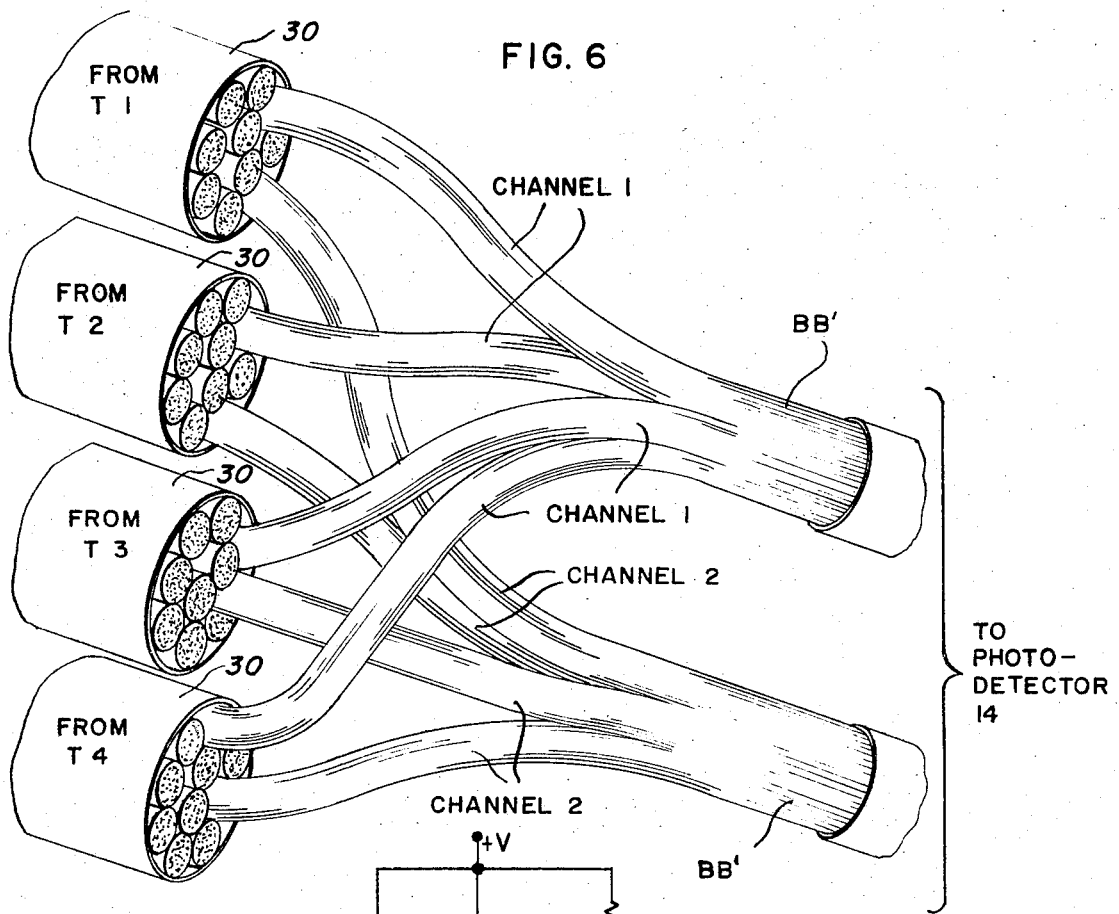
FIG. 6 is a detailed view illustrating the fiber optic junction of the pick-up bundles and the termination of the randomly spliced bundles at the photo detector.

The photodetector unit 14, as stated above, includes the same number of photodetector channels as the number of code tracks of the code pattern P, each channel being optically connected with all of the detection heads 13. That is, each of the detector heads 13 aligns a set 30 of ten fiber optic bundles BB corresponding to the ten track code P. The sets 30 are merged and regrouped, as indicated at J (see FIGS. 1 and 6) so that at the photodetector end a new set of ten bundles BB', each consisting only of fibers associated with a common track of the code patterns P, are formed. Thus, and with reference to FIG. 6, the bundle BB of each of the sets 30 corresponding to channel 1 of the code patterns P is optically channeled into one of bundles BB', those corresponding to channel 2 into another of the bundles BB', and so on with the remaining channels of the code patterns P. This multiplexing technique reduces the required number of receivers in the photodetection unit 14 thereby reducing the totality of low level circuitry. It will be noted that the individual fibers of each of the bundles BB corresponding to the same channel are randomly spliced at the junction J to insure uniform response at the photodetector unit 14 for each of the instruments.

Figure 7:
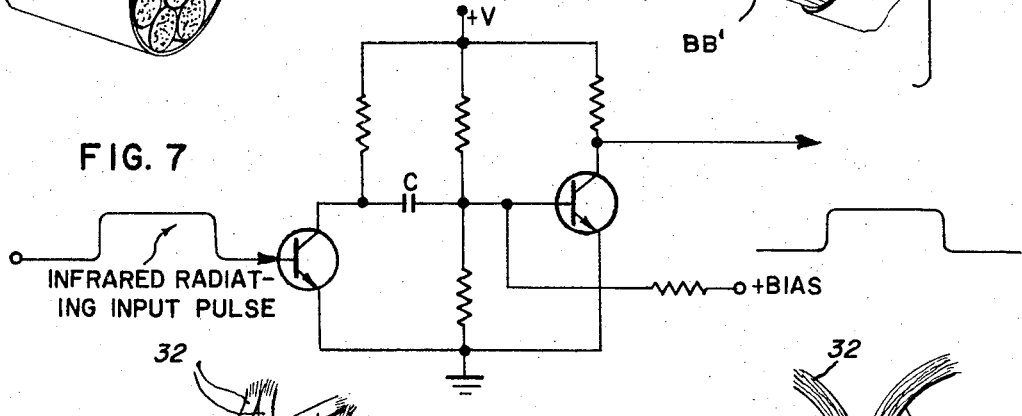
FIG. 7 is an electrical circuit diagram illustrating a typical photodetector circuit.

A typical photodetector circuit, as shown in FIG. 7, is arranged so that the photo-responsive element is sensitive only to pulses so that any ambient light levels that may be present, being essentially D.C., will not be processed. The photo-detector circuit includes a phototransistor responsive to infrared input and coupled through a capacitor to a transistor switch circuit. The pulsed excitation technique permits utilization of AC coupling and minimizes the effects of "dark currents" occasioned by variations in the phototransistor over the wide temperature range.

DISPLAY TAPES

A reflected Gray binery code pattern is provided on the tape to eliminate the possibility of ambiguity in the position reading. The technique of encoding on the rear of the tape, the digital equivalent of the visual display data printed on the front of the tape, permits any non-linear tape display function to be easily encoded and eliminates error such as could occur due to slippage in shafts or couplings.

The display tapes for use with the infrared transmission technique employed in the illustrated embodiment of FIGS. 1 to 7 utilizes a base strip of a high temperature polyimide, such as is marketed by DuPont under the trademark "KAPTON." The IR transmission (0.92 micron) for a strip of Kapton of .002 inches thickness is approximately 95 percent. To define the Gray code pattern of the tape, and the rear face is covered by a photoemulsion and exposed photographically so that the tape areas with no coding are transparent to IR transmission. Typically, a track width of 0.040 inches and a sensing window of 0.04 inches X 0.025 inches is employed.

The front face of the base strip is provided with white coatings to define the indicia and is provided with a black coating covering the remaining surface areas. A black nylon may be spray-deposited on the front face and cured in place to provide good adhesion. Various techniques may be employed for processing of the tape. For example, the black nylon may be photosensitive and applied full surface to the base strip, so that the numerals can then be photographically masked out. A white nylon may then be deposited directly to the Kapton to define the indicia. Alternatively, the Kapton may be coated with a photosensitive material and coatings may be deposited to define the numerals. A base strip as thus fabricated has no black on white or white on black to minimize transmission losses.

The white and black films deposited on the front surface are sufficiently thin to allow transmission of about 15 percent infrared radiation, yet appear opaque black and white when illuminated with visual radiation from the front and backed up with a black plate.

This tape arrangement provides high contrast to the viewer while enabling effective transmission of infrared and being substantially unaffected by ambient light or variations in the ambient light level.

The above monitoring system utilizes transmission of light through the tape for encoding. A similar overall system can be utilized whereby the coded track consists of a reflective metallic coating formed in the pattern of a reflective Gray binary code on an absorbing black material. Here, however, the infrared light, as illustrated in FIGS. 8 and 9, is detected by reflection rather than transmission.

Figure 8:
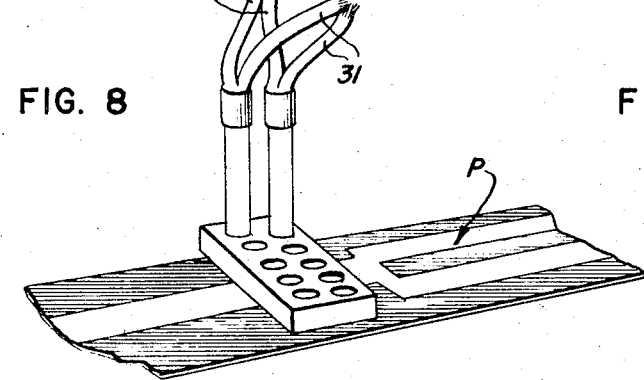
FIG. 8 is a detailed view illustrating an alternate monitoring system.
Figure 9:
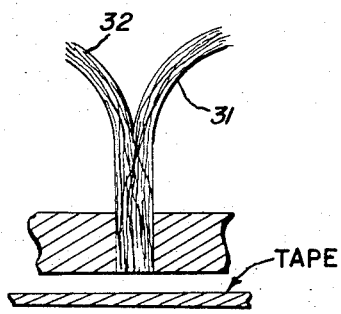
FIG. 9 is a detailed fragmentary view of a portion of the monitoring unit of FIG. 8.

As shown in FIG. 8, radiant energy is directed towards the code track P through a number of fiber optic bundles 31, the reflected radiant energy being transmitted to the photo-detector unit 14 through a corresponding number of fiber optic bundles 32. As best shown in FIG. 9, each of the detector bundles 32 is randomly spliced with a corresponding of the emitter bundles 31 to insure good optical transmission of the incident and reflected radiant energy.

The first part of the tape in this reflective system may be fabricated in any desired way since the code in the rear is completely independent of the front. The rear coding is formed by first applying a metallic film and then superimposing an absorbing film in the code pattern desired (such as by photo-emulsion).

Light reflection ratio in the infrared region (9200 Angstroms) of the order of ten to one may be obtained from the reflective surface (such as aluminum) compared to a black absorbing film. This represents a reasonable ratio for a practical system. However, this ratio will deteriorate with wear and tear on the surface and this system is more sensitive to light level and photodetector and amplifier sensitivity than the system based on transmission, where a ratio of signal of more than 100 to 1 between light transmission and opaque regions in the tape may be obtained.

If the type of construction of the tape described for the transmissive light system cannot be tolerated, or the tape head must be located directly behind the display then the reflective system may be utilized to advantage.

Thus, while preferred constructional features of the invention are embodied in the structure illustrated herein, it is to be understood that changes and variations may be made by those skilled in the art without departing from the spirit and scope of the appended claims.

What is claimed is:

1. A multiple display arrangement comprising a plurality of tapes each having a light selective coded pattern in predetermined lengthwise distributed relation thereon, a plurality of light emitting means, one for each tape, each irradiating the coded pattern of the corresponding tape with emitted light, common light detection means for said tapes and responsive to code selected light radiating from the coded patterns of said tapes to produce output digital signals representative of actual tape position, exciter means sequentially actuating said plurality of light emitting means in a predetermined time-sequence for producing said output digital signals from said detection means in a corresponding time sequence, a plurality of input registers for providing a plurality of digital input signals representative of the required position of the tapes, a plurality of servo-positioning means, one for each tape, and means operating in synchronism with said exciter means to compare in a corresponding time sequence the digital input signals and the digital output signals derived for each tape to provide a separate control signal for actuating each servo-positioning means.

2. A multiple display arrangement in accordance with claim 1 wherein each said coded pattern includes a common number of tracks, said light detection means including a separate light detector for each track of said coded pattern, and a plurality of sets of optical pick-up lines, one of said sets for each tape and each set including a separate line for each track of the corresponding coded pattern, each of said sets of pick-up lines being interposed between a corresponding one of said tapes and said light detection means to transmit code selected light from each track individually to a separate one of the light detectors.

3. A multiple display arrangement in accordance with claim 2 wherein each of said light emitting means includes a set of optical delivery lines that includes a separate delivery line for each track of said coded pattern, each said set of optical delivery lines having output ends individually optically aligned with input ends of the corresponding set of said pick-up lines.

4. A multiple display arrangement in accordance with claim 3 wherein each of the delivery lines comprise a fiber optic bundle, the bundles comprising each of said sets of optical delivery lines being randomly spliced together at their input ends, and wherein each of said light emitting means includes a plurality of light emitting diodes each positioned to illuminate the input ends of the corresponding one of said sets of optical delivery lines.

5. A multiple display arrangement in accordance with claim 3 wherein each said coded pattern is defined by light transmitting and light blocking areas on the corresponding tape, the output ends of the delivery lines comprising one of said sets of optical delivery lines and the input ends of the pick-up lines comprising a corresponding set of said optical pick-up lines being disposed in confronting relation on opposite sides of said tape.

6. A multiple display arrangement in accordance with claim 3 wherein said coded pattern is defined by light reflecting and light absorbing areas on said tape, the output ends of the delivery lines comprising one of said sets of optical delivery lines and the input ends of the pick-up lines comprising a corresponding set of said optical pick-up lines being disposed in optically confronting relation on the same side of said tape.

7. A multiple display arrangement comprising a plurality of tapes each having a light selective multi-track coded pattern in predetermined lengthwise distributed relation thereon, separate light emitter means for each tape for each irradiating the coded pattern of the corresponding tape with a redundant supply of emitted light, common light detection means for said tapes and responsive to code selected light radiating from the coded patterns for producing output digital signals representative of actual tape position, exciter means sequentially actuating the emitting means in a predetermined time-sequence for producing the digital output signals from said detection means in a corresponding time sequence, a plurality of input registers for providing a plurality of digital input signals representative of the required positions of the tapes, a plurality of servo-positioning means, one for each tape, and a means operating in synchronism with said exciter means to compare in a corresponding time sequence the digital input signals and the digital output signals derived for each tape to provide a separate control signal for actuating each servo-positioning means.

8. A multiple display arrangement in accordance with claim 7 wherein each of said emitting means includes a plurality of light emitting diodes arranged to provide an area of superimposed emitted light and a plurality of optical delivery lines positioned to jointly receive the superimposed light and individually deliver components of the superimposed light toward one each of the tracks of the corresponding coded pattern.

9. A multiple display arrangement in accordance with claim 8 wherein the light emitting diodes of each of said emitting means comprise series-connected infrared emitting diodes.

10. A multiple display arrangement in accordance with claim 8 and including a separate set of series-connected diodes connected in shunt with each of said light emitting diodes and exhibiting a voltage drop slightly greater than the voltage drop of the corresponding emitting diode.

11. A multiple display arrangement comprising a plurality of tapes each having a multi-track coded pattern in predetermined length-wise distributed relation thereon, each coded pattern consisting of a common number of tracks, a plurality of light emitter means, one for each tape, each of said emitter means including a plurality of light emitting diodes arranged to provide an area of superimposed emitted light and a plurality of optical delivery lines positioned to jointly receive the superimposed light and individually deliver components of the superimposed light toward one each of the tracks of the corresponding coded pattern, common light detection means for said tapes and including a separate light detector for each track of said multi-track coded pattern, and a separate set of optical pick-up lines disposed in light transmitting relation with each of said photo detectors, the pick-up lines of each set being disposed in light receiving relation with one track each of the coded pattern of all said tapes, exciter means sequentially actuating said plurality of light emitter means in a predetermined time-sequence for producing digital output signals from said detection means in a corresponding time sequence representing the actual position of each tape, a plurality of input registers for providing a plurality of digital input signals representative of the required position of the tapes, a plurality of servo-positioning means, one for each tape, and means operating in synchronism with said exciter means to compare in a corresponding time sequence the digital input signals derived for each tape to provide a separate control signal for actuating each servo-positioning means.

* * * * *